(12) United States Patent
Zhang et al.

(10) Patent No.: US 10,588,064 B2
(45) Date of Patent: Mar. 10, 2020

(54) METHOD FOR TRANSMITTING SYSTEM INFORMATION, BASE STATION, TERMINAL, AND SYSTEM

(71) Applicant: Huawei Technologies Co., Ltd., Shenzhen (CN)

(72) Inventors: Jian Zhang, Shenzhen (CN); Bingyu Qu, Beijing (CN); Yuanjie Li, Shanghai (CN); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/965,137

(22) Filed: Apr. 27, 2018

(65) Prior Publication Data
US 2018/0249387 A1  Aug. 30, 2018

Related U.S. Application Data

(63) Continuation of application No. PCT/CN2016/101914, filed on Oct. 12, 2016.

(30) Foreign Application Priority Data

Oct. 29, 2015  (CN) .......................... 2015 1 0718080

(51) Int. Cl.
*H04W 36/00* (2009.01)
*H04W 88/08* (2009.01)
(Continued)

(52) U.S. Cl.
CPC ....... *H04W 36/0094* (2013.01); *H04L 5/0053* (2013.01); *H04W 48/08* (2013.01);
(Continued)

(58) Field of Classification Search
CPC ............. H04W 48/08; H04W 72/0413; H04W 74/0833; H04W 88/08; H04W 72/00; H04W 76/27
See application file for complete search history.

(56) References Cited

U.S. PATENT DOCUMENTS

2010/0214995 A1  8/2010  Iyer et al.
2014/0314000 A1*  10/2014  Liu ..................... H04W 72/042
                                                  370/329
(Continued)

FOREIGN PATENT DOCUMENTS

CN  102223690 A  10/2011
CN  102318409 A  1/2012
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331, V12.7.0, Sep. 2015, 453 pages.
(Continued)

*Primary Examiner* — Ayaz R Sheikh
*Assistant Examiner* — Debebe A Asefa
(74) *Attorney, Agent, or Firm* — Slater Matsil, LLP

(57) ABSTRACT

In an embodiment method, a terminal sends an uplink signal. The uplink signal is used to trigger a base station to send first system information, and the first system information is used by the terminal to camp on a cell. In the embodiment method, correspondingly, the base station receives the uplink signal sent by the terminal, and the base station sends the first system information on a beam in which the terminal is located. In the embodiment method, correspondingly, the terminal receives the first system information sent by the base station on the beam in which the terminal is located.

16 Claims, 5 Drawing Sheets

(51) Int. Cl.
   *H04L 5/00*   (2006.01)
   *H04W 48/08*  (2009.01)
   *H04W 72/04*  (2009.01)
   *H04W 74/08*  (2009.01)
(52) U.S. Cl.
   CPC ... *H04W 72/0413* (2013.01); *H04W 74/0833* (2013.01); *H04W 88/08* (2013.01)

(56) References Cited

U.S. PATENT DOCUMENTS

| | | |
|---|---|---|
| 2014/0376466 A1 | 12/2014 | Jeong et al. |
| 2015/0003266 A1 | 1/2015 | Guo |
| 2015/0016419 A1 | 1/2015 | Kim et al. |
| 2015/0133128 A1 | 5/2015 | Xiong et al. |
| 2015/0256995 A1 | 9/2015 | Rune et al. |
| 2016/0204920 A1 | 7/2016 | Benjebbour et al. |
| 2016/0212609 A1* | 7/2016 | Fujishiro ............... H04W 76/14 |
| 2017/0111831 A1 | 4/2017 | Xiao et al. |

FOREIGN PATENT DOCUMENTS

| | | |
|---|---|---|
| CN | 102695226 A | 9/2012 |
| CN | 103220704 A | 7/2013 |
| CN | 104349420 A | 2/2015 |
| EP | 2080295 B1 | 5/2015 |
| JP | 2015502062 A | 1/2015 |
| JP | 2015041857 A | 3/2015 |
| KR | 101429285 B1 | 8/2014 |
| WO | 2013068368 A1 | 5/2013 |
| WO | 2013068369 A1 | 5/2013 |
| WO | 2014009246 A1 | 1/2014 |
| WO | 2014153756 A1 | 10/2014 |
| WO | 20150113689 A1 | 8/2015 |
| WO | 2016130353 A2 | 8/2016 |
| WO | 2016130354 A1 | 8/2016 |
| WO | 2016130355 A1 | 8/2016 |

OTHER PUBLICATIONS

IEEE Computer Society, "Part 11: Wireless LAN Medium Access Control (MAC) and Physical Layer (PHY) Specifications; Amendment 3: Enhancements for Very High Throughput in the 60 GHz Band," IEEE Std 802.11ad™-2012 (Amendment to IEEE Std 802.11™-2012, as amended by IEEE Std 802.11ae™-2012 and IEEE Std 802.11aa™-2012), Dec. 28, 2012, 628 pages.

* cited by examiner

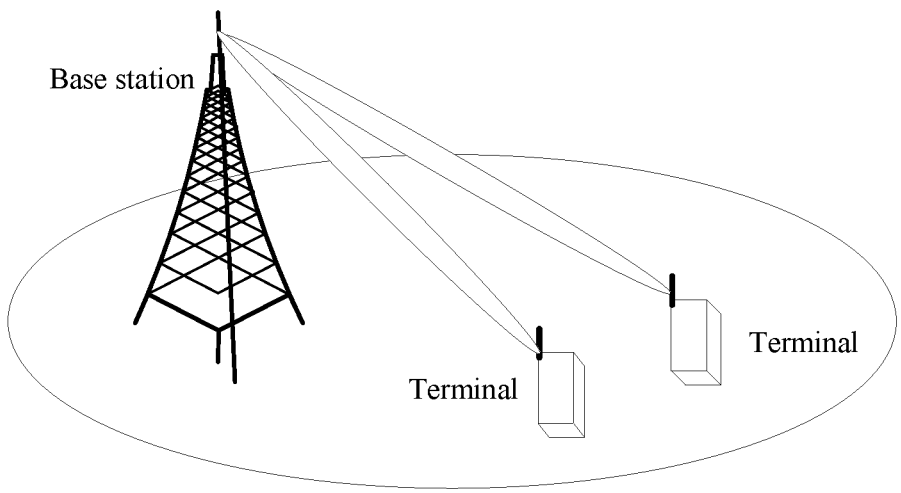

FIG. 1

```
┌─────────────────────────────────────────────────────┐  ╭ 201
│ A terminal sends an uplink signal, where the uplink │ ╱
│ signal is used to trigger a base station to send    │╱
│ first system information, and the first system      │
│ information is used by the terminal to camp on a cell│
└─────────────────────────────────────────────────────┘
                        ▼
┌─────────────────────────────────────────────────────┐  ╭ 202
│ The base station receives the uplink signal sent by │ ╱
│ the terminal, where the uplink signal is used to    │╱
│ trigger the base station to send the first system   │
│ information, and the first system information is    │
│ used by the terminal to camp on the cell            │
└─────────────────────────────────────────────────────┘
                        ▼
┌─────────────────────────────────────────────────────┐  ╭ 203
│ The base station sends the first system information │ ╱
│ on a beam in which the terminal is located          │╱
└─────────────────────────────────────────────────────┘
                        ▼
┌─────────────────────────────────────────────────────┐  ╭ 204
│ The terminal receives the first system information  │ ╱
│ sent by the base station on the beam in which the   │╱
│ terminal is located                                 │
└─────────────────────────────────────────────────────┘
```

FIG. 2

METHOD FOR TRANSMITTING SYSTEM INFORMATION, BASE STATION, TERMINAL, AND SYSTEM

CROSS-REFERENCE TO RELATED APPLICATIONS

This application is a continuation of International Application No. PCT/CN2016/101914, filed on Oct. 12, 2016, which claims priority to Chinese Patent Application No. 201510718080.9, filed on Oct. 29, 2015. The disclosures of the aforementioned applications are hereby incorporated by reference in their entireties.

TECHNICAL FIELD

The present invention relates to communications technologies, and in particular, to a method for transmitting system information, a base station, a terminal, and a system.

BACKGROUND

With rapid development of packet services and intelligent terminals, high-speed large-data-volume services have a growing demand for spectrums. A low frequency band is usually a spectrum in a range of below 3 GHz. A centimetric wave frequency band is usually a spectrum ranging from 3 GHz to 30 GHz. A millimetric wave frequency band is usually a spectrum ranging from 30 GHz to 300 GHz. A frequency band of about 2 GHz or lower is usually used in conventional cellular communications. In the conventional cellular communications, a common signal of a cell, such as system information, is usually sent by means of omni transmission, resulting in relatively large power consumption of a base station.

SUMMARY

Embodiments of the present invention provide a method for transmitting system information, a base station, a terminal, and a system, so as to resolve a problem that power consumption is relatively large when a base station sends system information in cellular communications.

According to an aspect, an embodiment of the present invention provides a method for transmitting system information. The method includes sending, by a terminal, an uplink signal. The uplink signal is used to trigger a base station to send first system information, and the first system information is used by the terminal to camp on a cell. The method further includes correspondingly, receiving, by the base station, the uplink signal sent by the terminal. The method further includes sending, by the base station, the first system information on a beam in which the terminal is located. The method further includes correspondingly, receiving, by the terminal, the first system information sent by the base station on the beam in which the terminal is located.

In a possible design, before receiving the uplink signal sent by the terminal, the base station further sends, in the cell, a downlink signal by using at least one beam, where the downlink signal includes a downlink discovery reference signal (DRS), and the downlink DRS is used by the terminal to discover the cell; and correspondingly, before sending the uplink signal, the terminal further receives the downlink signal sent by the base station in the cell by using the at least one beam. In this way, the terminal may determine, according to the downlink DRS, whether a current location of the terminal is covered by the cell, and may obtain information about the beam in which the terminal is currently located.

In a possible design, before sending the uplink signal, the terminal further predetermines, according to the downlink DRS, that the cell is suitable for camping. In this way, the terminal may purposely send the uplink signal to a base station that the terminal is likely to camp on.

In a possible design, the terminal sends the uplink signal to the base station according to configuration information of the uplink signal, and correspondingly, the base station receives the uplink signal that is sent by the terminal according to the configuration information of the uplink signal. The configuration information of the uplink signal may be preset, or may be included in the downlink signal sent by the base station. When the configuration information of the uplink signal is preset, downlink signaling overheads of the base station may be reduced. When the configuration information of the uplink signal is sent by the base station, the terminal may send the uplink signal more flexibly.

In a possible design, after receiving the first system information sent by the base station on the beam in which the terminal is located, the terminal further initiates a radio resource control (RRC) connection setup process to the base station according to the first system information; the base station further sends, in the RRC connection setup process or after the RRC connection setup process, second system information on the beam in which the terminal is located, where the second system information is used by the terminal to perform communication in the cell; and correspondingly, the terminal receives, in the RRC connection setup process or after the RRC connection setup process, the second system information sent by the base station on the beam in which the terminal is located. Therefore, the base station needs to send second system information only to a terminal in an RRC connected mode. This reduces system overhead.

In a possible design, after sending an RRC connection setup message, the base station sends the second system information on the beam in which the terminal is located, or after receiving an RRC connection setup complete message sent by the terminal, the base station sends the second system information on the beam in which the terminal is located; and correspondingly, the terminal receives the second system information that is sent by the base station after the base station sends the RRC connection setup message, or the terminal receives the second system information that is sent by the base station after the base station receives the RRC connection setup complete message sent by the terminal. Therefore, the base station may send the second system information to the terminal at an appropriate occasion according to an actual situation.

In a possible design, the first system information includes at least one of broadcast channel configuration information, operator information, and tracking area information. Further, the first system information may include paging channel configuration information, where the paging channel configuration information is used by the terminal to calculate a paging window. For example, the terminal may calculate the paging window according to the paging channel configuration information, and receive, in the paging window, a paging message. In this way, when the base station sends the system information in a beam manner, the terminal does not miss the paging message.

According to another aspect, an embodiment of the present invention provides another method for transmitting system information. The method includes sending, by a terminal, an uplink signal. The uplink signal is used to trigger a base station to send first system information and second system information. The method includes correspondingly, receiving, by the base station, the uplink signal sent by the terminal. The method includes sending, by the base station, the first system information and the second system information on a beam in which the terminal is located. The method includes correspondingly, receiving, by the terminal, the first system information and the second system information that are sent by the base station on the beam in which the terminal is located. In this way, the terminal may rapidly establish a communication service in a cell after receiving the first system information and the second system information.

According to still another aspect, an embodiment of the present invention provides a base station. The base station has functions of implementing behaviors of the base station in the foregoing method design. The functions may be implemented by hardware, or may be implemented by hardware executing corresponding software. The hardware or software includes one or more modules that are corresponding to the foregoing functions.

In a possible design, a structure of the base station includes a processor and a transmitter. The processor is configured to support the base station in performing a corresponding function in the foregoing method. The transmitter is configured to support communication between the base station and a terminal. The transmitter is further configured to send, to the terminal, the information or instruction included in the foregoing method. The base station may further include a memory. The memory is configured to be coupled with the processor, and stores a program instruction and data that are necessary for the base station.

According to still another aspect, an embodiment of the present invention provides a terminal. The terminal has functions of implementing behaviors of the terminal in the foregoing method design. The functions may be implemented by hardware, or may be implemented by hardware executing corresponding software. The hardware or software includes one or more modules that are corresponding to the foregoing functions. The modules may be software and/or hardware.

In a possible design, a structure of the terminal includes a receiver and a processor. The receiver is configured to support the terminal in receiving first system information and/or second system information sent by the foregoing base station. The processor controls the terminal to: predetermine, according to a downlink DRS received by the receiver, that a cell is suitable for camping; or initiate an RRC connection setup process according to the first system information received by the receiver; or calculate a paging window.

According to still another aspect, an embodiment of the present invention provides a communications system. The system includes the base station and the terminal described in the foregoing aspects.

According to yet another aspect, an embodiment of the present invention provides a computer storage medium, configured to store a computer software instruction used by the foregoing base station. The computer software instruction includes a program that is designed for executing the foregoing aspects.

According to yet another aspect, an embodiment of the present invention provides a computer storage medium, configured to store a computer software instruction used by the foregoing terminal. The computer software instruction includes a program that is designed for executing the foregoing aspects.

Compared with the prior art, in the solutions provided in the present invention, system information can be sent on demand, so that power consumption of the base station and system overheads can be reduced.

BRIEF DESCRIPTION OF THE DRAWINGS

To describe the technical solutions in the embodiments of the present invention more clearly, the following briefly describes the accompanying drawings required for describing the embodiments of the present invention. The accompanying drawings in the following description show some embodiments of the present invention, and a person of ordinary skill in the art can derive other drawings from these accompanying drawings without creative efforts.

FIG. 1 is a schematic diagram of a possible system network according to the present invention;

FIG. 2 is a schematic flowchart of transmitting system information according to an embodiment of the present invention;

DETAILED DESCRIPTION OF ILLUSTRATIVE EMBODIMENTS

Figure 3A:
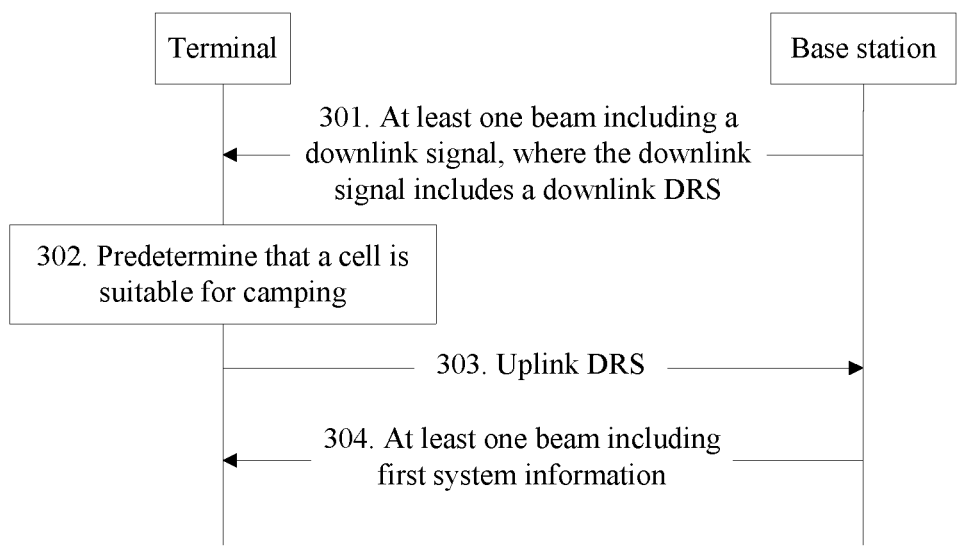
FIG. 3a is a schematic communication diagram of transmitting first system information according to an embodiment of the present invention.

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A network architecture and a service scenario that are described in the embodiments of the present invention are intended to describe the technical solutions in the embodiments of the present invention more clearly, and do not constitute any limitation on the technical solutions provided in the embodiments of the present invention. A person of ordinary skill in the art may understand that, with evolution of a network architecture and emergence of a new service scenario, the technical solutions provided in the embodiments of the present invention are also applicable to a similar technical problem.

As shown in FIG. 1, a base station sends, in a cell, a signal to a terminal in a beamforming manner. In the embodiments of the present invention, the beamforming manner may be a beam switching manner, usually implemented by using an analog circuit or a radio frequency circuit, or may be an adaptive beam manner, usually implemented by using a digital circuit. In addition, a beam may be a horizontal beam, or may be a vertical beam. The technical solutions described in the embodiments of the present invention may be applicable to a Long Term Evolution (LTE) system, or other wireless communications systems that use various radio access technologies, for example, systems that use Code Division Multiple Access, Frequency Division Multiple Access, Time Division Multiple Access, orthogonal frequency division multiple access, single carrier frequency division multiple access, and other access technologies. In addition, the technical solutions may also be applicable to a subsequent evolved system of the LTE system, for example, a 5th Generation (5G) system.

A base station included in the embodiments of the present invention is an apparatus that is deployed in a radio access network and that is configured to provide a wireless communication function for a terminal. In systems that use different radio access technologies, a name of the base station may be different. For example, in the LTE system, the base station may be an evolved NodeB (eNB or eNodeB); in a 3rd generation (3G) system, the base station may be a NodeB; and in a 2nd generation (2G) system, the base station may be a base transceiver station (BTS). It should be understood that the base station in the embodiments of the present invention includes a base station in an existing communications system, and also includes a base station in a possible future communications system. This is not limited in the embodiments of the present invention.

A terminal included in the embodiments of the present invention may be a wireless terminal, and the wireless terminal may be a device providing voice or data connectivity for a user, a handheld device with a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone) or a computer with a mobile terminal. For example, the wireless terminal may be a portable, pocket-sized, handheld, computer built-in, or in-vehicle mobile apparatus, and exchanges voice or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console, a remote station, an access point (AP), a remote terminal, an access terminal, a user terminal, a user agent, a user device, or user equipment (UE).

The technical solutions provided in the embodiments of the present invention may be applied to a scenario in which a low frequency cell in a cellular communications system operates as an independent cell. Compared with a method of sending system information in a conventional omni transmission manner, in the solutions provided in the embodiments of the present invention, system information is sent in a cell by using a beam, greatly reducing system overheads. The technical solutions provided in the embodiments of the present invention may also be applied to a scenario in which a high frequency cell in a cellular communications system operates as an independent cell. If the omni transmission manner is still used in the high frequency cell to send system information, not only power consumption of a base station is relatively large, but also a transmission range is quite limited. In the solutions provided in the embodiments of the present invention, a coverage area and a capacity that are of a cell are ensured while system overheads are reduced. It can be understood that the technical solutions provided in the embodiments of the present invention may also be applied to a scenario of joint networking of a high frequency cell and a low frequency cell in cellular communications system.

The following further describes the embodiments of the present invention in detail based on the foregoing common features included in the embodiments of the present invention.

An embodiment of the present invention provides a method for transmitting system information, and a base station, a terminal, and a system that are based on the method. A terminal sends an uplink signal, where the uplink signal is used to trigger a base station to send first system information, and the first system information is used by the terminal to camp on a cell. After receiving the uplink signal, the base station sends the first system information on a beam in which the terminal is located. Correspondingly, the terminal receives the first system information sent by the base station on the beam in which the terminal is located. After receiving the first system information, the terminal may further initiate a radio resource control (RRC) connection setup process to the base station according to the first system information. The base station further sends, in the RRC connection setup process or after the RRC connection setup process, second system information on the beam in which the terminal is located, where the second system information is used by the terminal to perform communication in the cell. Correspondingly, the terminal receives the second system information sent by the base station on the beam in which the terminal is located. It should be noted that when the terminal is a terminal in an RRC idle mode, the base station only needs to send the first system information on the beam in which the terminal is located; when the terminal is a terminal in an RRC connected mode, the base station only needs to send the second system information on the beam in which the terminal is located.

The first system information and the second system information are described below by using an LTE system as an example. In the LTE system, the 3rd Generation Partnership Project (3GPP) specifies a series of provisions for system information according to the TS36.331 protocol. In the solution in this embodiment of the present invention, existing system information is divided into the first system information and the second system information. It can be understood that in a future new communications system, new system information may be introduced, or the existing system information may be consolidated or reclassified, and the new system information or reclassified system information may also be added, according to their functions, to the first system information or the second system information described in this embodiment of the present invention. The first system information or the second system information described in this embodiment of the present invention is not limited to the existing system information listed below. The following describes the first system information and the second system information.

The first system information is used by the terminal to camp on the cell. In an example, the first system information includes at least one of broadcast channel (BCH) configuration information, operator information, and tracking area information. The broadcast channel configuration information includes at least one of the following information: downlink bandwidth information, a system frame number (SFN), and physical hybrid automatic retransmission request indicator channel (PHICH) configuration information. The operator information may be public land mobile network (PLMN) list information. The tracking area information may be a tracking area code (TAC).

In an example, the first system information further includes at least one of information included in a system information block (SIB) 1 to an SIB5. The SIB1 includes information for evaluating whether to allow the terminal to access the cell and scheduling information of other system information. An SIB2 includes common radio resource configuration information that is applicable to all terminals. An SIB3 includes common information that is applicable to at least one of intra-frequency cell reselection, inter-frequency cell reselection, and inter-system cell reselection. An SIB4 includes information of a cell requiring a specific reselection parameter and cell blacklist information, that is, list information of a cell that the terminal is not allowed to camp on or access. The SIB5 includes inter-frequency cell reselection information, for example, frequency information of another evolved universal terrestrial radio access network (E-UTRAN) and information related to an inter-frequency neighboring cell. For example, the first system information further includes at least one of the following information:

a. The first system information may include cell selection configuration information. Example cell selection configuration information includes at least one of the following information: a minimum reference signal received power (RSRP) class required for cell selection, and a minimum RSRP class offset required for cell selection;

b. The first system information may include cell selection configuration information. Example cell reselection configuration information includes at least one of the following information: a reselection threshold, a cell reselection priority, intra-frequency cell reselection configuration information, and inter-frequency cell reselection configuration information, where the intra-frequency cell reselection configuration information includes at least one of the following information: a minimum RSRP class required for cell reselection, an antenna port 1 presence indicator, and neighboring cell configuration information, and the neighboring cell configuration information includes a physical cell identity, an inter-cell offset, and a reselection timer; and the inter-frequency cell reselection configuration information includes at least one of the following information: carrier frequency list configuration information, a downlink carrier frequency, a minimum RSRP class offset required for cell selection or cell reselection, a reselection timer, a lower reselection threshold, an allowed measurement bandwidth, an antenna port 1 presence indicator, and neighboring cell configuration information, and the neighboring cell configuration information includes a physical cell identity and an inter-cell offset;

c. The first system information may include system configuration information. Example system configuration information includes at least one of the following information: a time division duplex configuration, a system value tag, access category barring information (for example, a cell barred indicator), frequency or frequency band indicator information, broadcast control channel (BCCH) configuration information, and a cell identity (CI);

d. The first system information may include random access configuration information. Example random access configuration information includes at least one of the following information: physical random access channel (PRACH) configuration information, and random access channel (RACH) common configuration information, where the physical random access channel configuration information includes at least one of the following information: a root sequence index and a physical random access channel configuration index, and the random access channel common configuration information includes preamble information;

e. The first system information may include paging channel (PCH) configuration information. Example PCH configuration information includes at least one of the following information: a paging record list, a system information modification, a UE identity (for example, an S-TMSI (system architecture evolution-temporary mobile subscriber identity) or an IMSI (international mobile subscriber identity)), and core network domain (, for example, a circuit domain or a packet domain) information; and f. The first system information may include physical channel configuration information. Example physical channel configuration information includes physical downlink shared channel (PDSCH) common configuration information, physical uplink shared channel (PUSCH) common configuration information, physical uplink control channel (PUCCH) common configuration information, uplink power control (UPC) common configuration information, and an uplink cyclic prefix length.

In an example, when the first system information includes only some of the information listed in the foregoing "a to f", a priority of the information listed in "a to f" is sorted from a to f, and the first system information preferentially includes information with a higher priority. Certainly, the priority of the information may alternatively be sorted according to another manner. This embodiment of the present invention does not limit a priority order of the information listed in "a to f".

The second system information is used by the terminal to perform communication in the cell. The second system information includes all system information other than the first system information, for example, information in an SIB6 to an SIB19. The SIB6 to an SIB8 include information related to inter-system cell reselection. An SIB9 includes name information of a home base station. An SIB10 includes primary notification information of an earthquake and tsunami warning system (ETWS). An SIB11 includes secondary notification information of the ETWS. An SIB12 includes notification information of a commercial mobile alert system (CMAS). An SIB13 includes a multimedia broadcast multicast system (MBMS). An SIB14 includes an extended access barring (EAB) parameter. An SIB15 includes an MBMS service area identifier (SAI) and/or a neighboring-cell carrier frequency. An SIB16 includes global positioning system (GPS) time and collaboration universal time. An SIB17 includes service guide information of an E-UTRAN and a wireless local area network (WLAN). An SIB18 indicates terminal process information that the E-UTRAN supports device-to-device (D2D) communication. The SIB19 includes resource configuration information related to that the E-UTRAN supports D2D discovery.

It should be noted that when all or some of the information listed in the foregoing "a to f" is not included in the first system information, the information is included in the second system information.

For names of various information included in the first system information and the second system information, for clarity of description, the following abbreviated forms of the names are used as examples for description:

Downlink bandwidth dl-Bandwidth
Cell barred cell barred
Frequency band indicator FreqBandIndicator
Minimum RSRP class q-RxLevMin
Minimum RSRP class offset q-RxLevMinOffset
Reselection threshold ThreshServingLow
Cell reselection priority cellReselectionPriority
Antenna port 1 presence presenceAntennaPort1
Neighboring cell configuration neighCellConfig
Physical cell identity physCellID
Inter-cell offset q-OffsetCell
Reselection timer t-ReselectionEUTRA
Carrier frequency list configuration information InterFreqCarrierFreqList
Downlink carrier frequency dl-CarrierFreq
Lower reselection threshold threshX-Low
Allowed measurement bandwidth allowedMeasBandwidth
Time division duplex configuration tdd-Config
System value tag systemInfoValueTag
Access category barring information ac-BarringInfo
Frequency indicator information FreqInfo
Root sequence index rootSequenceIndex
Physical random access channel configuration prach-ConfigIndex
index
Preamble information preambleInfo
Paging record list pagingRecordList
System information modification systemInfoModification
Uplink cyclic prefix length ul-CyslicPrefixLength In conventional cellular communications, a base station usually sends all system information in a cell range by using an omni transmission manner. This causes quite large power consumption of the base station. According to the solution provided in this embodiment of the present invention, system information can be sent on demand. For example, the base station only needs to send the first system information in a beam coverage area of a terminal that is in an RRC idle mode, and send the second system information in a beam coverage area of a terminal that is in an RRC connected mode. The solution of sending system information on demand greatly reduces overheads, especially when a plurality of terminals in an RRC idle mode or an RRC connected mode are located in different beam coverage areas, and the base station needs to send system information in the different beams.

The following describes a solution provided in an embodiment of the present invention with reference to FIG. 2.

In a part 201, a terminal sends an uplink signal, where the uplink signal is used to trigger a base station to send first system information, and the first system information is used by the terminal to camp on a cell. The uplink signal may be an uplink discovery reference signal (DRS), may be a sounding reference signal (SRS), or may be a random access preamble, or a preset signal that is specially used to trigger the base station to send the first system information.

In an example, before sending the uplink signal, the terminal further receives a downlink signal sent by the base station in the cell by using at least one beam, where the downlink signal includes a downlink DRS, and the downlink DRS is used by the terminal to discover the cell. In this way, the terminal may determine, according to the downlink DRS, whether a current location of the terminal is covered by the cell, and may obtain information about the beam in which the terminal is currently located.

In an example, before sending the uplink signal, the terminal further predetermines, according to the downlink DRS, that the cell is suitable for camping. For example, the terminal performs predetermining according to a reference signal strength indicator (RSSI) of the downlink DRS or a reference signal received power (RSRP) of the downlink DRS. In this way, the terminal may purposely send the uplink signal to a base station that the terminal is quite likely to camp on.

In an example, the terminal sends the uplink signal according to configuration information of the uplink signal. The configuration information of the uplink signal may be preset, so as to reduce downlink signaling overheads of the base station; or the configuration information of the uplink signal may be included in the downlink signal sent by the base station, so that the terminal may send the uplink signal more flexibly; or the configuration information of the uplink signal may be obtained by using another manner. This is not limited in this embodiment of the present invention.

In a part 202, the base station receives the uplink signal sent by the terminal, where the uplink signal is used to trigger the base station to send the first system information, and the first system information is used by the terminal to camp on the cell.

In an example, before receiving the uplink signal sent by the terminal, the base station further sends, in the cell, the downlink signal by using the at least one beam, where the downlink signal includes the downlink DRS, and the downlink DRS is used by the terminal to discover the cell.

In an example, the base station receives the uplink signal sent by the terminal according to the configuration information of the uplink signal.

In the part 202, for content similar to or corresponding to the part 201, refer to the detailed descriptions in the part 201. Details are not described herein again.

In a part 203, the base station sends the first system information on the beam in which the terminal is located. For example, the base station may immediately send the first system information on the beam in which the terminal is located after receiving the uplink signal sent by the terminal, so that the terminal may obtain the first system information quickly; or the base station may send, according to a preset time period, the first system information on the beam in which the terminal is located. This may reduce signaling overheads of the base station for sending, in a same beam coverage area, the first system information to a plurality of terminals.

In a part 204, the terminal receives the first system information sent by the base station on the beam in which the terminal is located.

In an example, after receiving the first system information sent by the base station on the beam in which the terminal is located, the terminal further initiates an RRC connection setup process to the base station according to the first system information. For example, the terminal may initiate the RRC connection setup process by means of random access.

In an example, after sending the first system information on the beam in which the terminal is located, the base station further sends, in the RRC connection setup process initiated by the terminal according to the first system information or after the RRC connection setup process, the second system information on the beam in which the terminal is located, where the second system information is used by the terminal to perform communication in the cell. For example, the base station may send the second system information after receiving an RRC connection setup message sent by the terminal; or the base station may send the second system information after receiving an RRC connection setup complete message sent by the terminal; or the base station may send, by using a dedicated RRC signaling, the second system information to the terminal. Correspondingly, the terminal receives, in the RRC connection setup process or after the RRC connection setup process, the second system information sent by the base station on the beam in which the terminal is located. For example, the terminal may receive the second system information that is sent by the base station after the base station sends the RRC connection setup message; or the terminal may receive the second system information that is sent by the base station after the base station receives the RRC connection setup complete message sent by the terminal; or the terminal may receive the second system information sent by base station by using the dedicated RRC signaling. Certainly, the base station may alternatively send the second system information on the beam in which the terminal is located before the RRC connection setup process. This is not limited in this embodiment. Therefore, the base station may send the second system information to the terminal at an appropriate occasion according to an actual situation.

In an example, the first system information includes at least one of broadcast channel configuration information, operator information, and tracking area information. Optionally, the first system information further includes paging channel configuration information, where the paging channel configuration information is used by the terminal to calculate a paging window. The paging window refers to a time length of one subframe or a plurality of subframes for monitoring a paging message, and the plurality of subframes may be continuous or discontinuous. In this way, when the base station sends the system information in a beam manner, the terminal does not miss the paging message.

The following further describes the embodiments of the present invention with reference to more accompanying drawings.

FIG. 3a is a schematic communication diagram of transmitting first system information according to an embodiment of the present invention.

In a part 301, a base station sends, in a cell, a downlink signal by using at least one beam, where the downlink signal includes a downlink DRS, and the downlink DRS is used for a terminal to discover the cell. Optionally, the downlink DRS includes a downlink synchronization signal, and the downlink synchronization signal is used by the terminal to achieve downlink synchronization with the base station. The downlink synchronization signal may be a single synchronization signal, or may include a downlink primary synchronization signal (PSS) and a downlink secondary synchronization signal (SSS). Optionally, the downlink DRS further includes at least one of the following signals: a cell-specific reference signal (CRS), and a channel state information-reference signal (CSI-RS).

In a part 302, after receiving the downlink signal sent by the base station in the cell by using the at least one beam, the terminal predetermines that the cell is suitable for camping. The terminal may predetermine, according to the downlink DRS, that the cell is suitable for camping. For example, the terminal predetermines, according to a reference signal strength indicator of the downlink DRS or a reference signal received power of the downlink DRS, that the cell is suitable for camping.

In an example, the downlink signal further includes at least one of PLMN information, cell selection information, and cell reselection information. After achieving downlink synchronization with the base station according to the downlink DRS, the terminal predetermines, according to the at least one of the PLMN information, the cell selection information, and the cell reselection information, that the cell is suitable for camping. It can be understood that the terminal may detect beams of different base stations, so as to receive downlink signals sent by the different base stations. When the downlink signals include at least one of PLMN information, cell selection information, and cell reselection information, the terminal may perform preliminary determining according to the at least one of the PLMN information, the cell selection information, and the cell reselection information that is sent by the different base stations, and then send an uplink DRS to the corresponding base station for the cell that is suitable for camping, to trigger the corresponding base station to send the first system information, without a need of performing determining after sending uplink DRSs to all detected base stations and receiving first system information sent by all the base stations, thereby reducing a delay and overheads. For example, the terminal may send an uplink DRS according to uplink DRS configuration information of a base station, to trigger the base station to send first system information to the terminal. Alternatively, a plurality of base stations use same uplink DRS configuration information, and an uplink DRS sent by the terminal may trigger the plurality of base stations to send first system information to a beam in which the terminal is located. The plurality of base stations may cooperatively transmit a time-frequency domain resource of the first system information to the terminal, so that the terminal may receive the first system information from the plurality of base stations respectively or simultaneously; and the terminal may choose, according to the first system information, to camp on a cell that is provided by one base station of the plurality of base stations, or may even camp on a plurality of cells simultaneously. A network may send a paging message to the terminal by using one or more cells.

In a part 303, the terminal sends an uplink DRS to the base station, where the uplink DRS is used to trigger the base station to send first system information.

In an example, the uplink DRS is a cell-specific uplink DRS or a beam-specific uplink DRS, and different terminals are not distinguished. Therefore, different terminals may select a same uplink DRS and a corresponding uplink resource and send the selected same uplink DRS to the base station.

In an example, the downlink signal sent by the base station further includes configuration information of the uplink DRS. If the terminal is to camp on the cell, the terminal sends the uplink DRS to the base station according to the configuration information of the uplink DRS, where the configuration information of the uplink DRS is sent by the base station; or the terminal may send the uplink DRS to the base station according to preset configuration information of the uplink DRS; or the terminal may generate a corresponding uplink DRS according to the downlink DRS and send the uplink DRS to the base station. It should be noted that, if the terminal has received the first system information on the beam in which the terminal is located, the terminal may not send the uplink DRS.

In an example, the terminal further adds a beam identifier to the uplink DRS, where the beam identifier is used to identify the beam in which the terminal is located.

In a part 304, after receiving the uplink DRS sent by the terminal, the base station sends the first system information on the beam in which the terminal is located, where the first system information is used by the terminal to camp on the cell.

It can be understood that if the downlink signal sent by the base station includes the at least one of the PLMN information, the cell selection information, and the cell reselection information, among the three types of information, for a part included in the downlink signal, this part is not included in the first system information sent by the base station; and for a part not included in the downlink signal, this part is included in the first system information sent by the base station. For example, if the downlink signal includes the PLMN information and does not include the cell selection information and the cell reselection information, the first system information herein includes the cell selection information and the cell reselection information. If the downlink signal includes the PLMN information and the cell selection information, the first system information herein includes the cell reselection information. If the downlink signal includes the PLMN information, the cell selection information, and the cell reselection information, the first system information does not include any of the three types of information.

In an example, the base station may determine, by using one of the following manners, the beam in which the terminal is located.

In a first manner, if the uplink DRS includes a beam identifier, the base station determines, according to the beam identifier, the beam in which the terminal is located.

In a second manner, the base station uses channel reciprocity to perform channel estimation on the uplink DRS sent by the terminal, so as to determine the beam in which the terminal is located in a downlink direction.

Figure 3B:
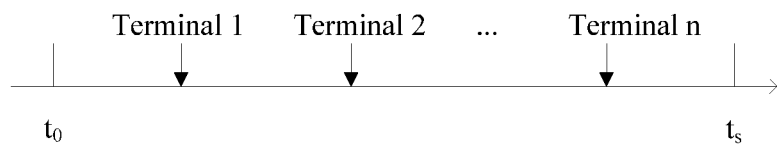
FIG. 3b is a schematic diagram of sending first system information by a base station according to an embodiment of the present invention.

In an example, the base station sends the first system information by using at least one beam within a preset time period, and performs sending according to a preset quantity of times. For example, as shown in FIG. 3b, for a beam, in a preset time period of $t_o$ to $t_s$, the base station may receive uplink DRSs sent by a plurality of terminals (for example, a terminal 1 to a terminal n) before a preset sending occasion $t_s$. After the base station determines that there is a terminal in this beam coverage area and the terminal expects to camp, the base station sends the first system information for one or more times in this beam coverage area at the preset sending occasion $t_s$, to avoid sending the first system information for each terminal that sends an uplink DRS, thereby reducing overheads.

In an example, when the base station receives uplink DRSs sent by terminals that are in different beam coverage areas, sending occasions at which the base station sends first system information by using the different beams may be the same or different. That the sending occasions are the same means: The base station simultaneously sends the first system information in the different beam coverage areas. That the sending occasions are different means: For example, for a beam 1 and a beam 2, the base station sends the first system information in a range of the beam 1 at a sending occasion 1 and sends the first system information in a range of the beam 2 at a sending occasion 2. The sending occasion 1 and the sending occasion 2 may be in different symbol locations of a same subframe or different subframes.

Correspondingly, the terminal receives the first system information sent by the base station on the beam in which the terminal is located. If the terminal does not receive the first system information in the preset time period after sending the uplink DRS, the terminal resends the uplink DRS to the base station. Optionally, the terminal performs sending after reselecting an uplink DRS and a corresponding uplink resource.

It should be noted that the base station may alternatively send the first system information to the terminal immediately after receiving the uplink DRS sent by the terminal, for example, send the first system information to the terminal by using dedicated RRC signaling.

In this embodiment of the present invention, for a terminal in an RRC idle mode, steps in the part 301 to the part 304 may be performed; for a terminal in an RRC connected mode, steps in the part 301 to the part 304 may not be performed, or only a corresponding step in the part 304 may be performed. That is, the base station sends the first system information on the beam in which the terminal is located, and correspondingly, the terminal receives the first system information sent by the base station.

In an example, if the first system information changes, the base station sends, in all beams in a cell range, changed first system information, so that all terminals in the cell range can receive the changed first system information. It can be understood that the first system information does not change frequently. Therefore, overheads are small. This avoids overheads for maintaining, by the base station, information about the beam in which the terminal is located.

Figure 4:
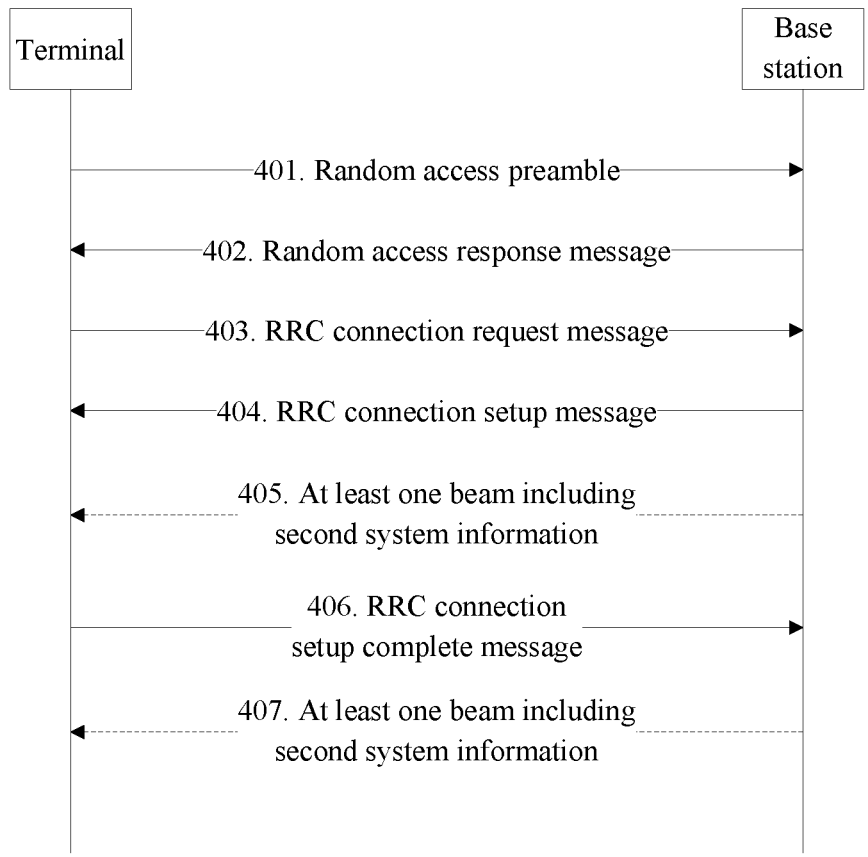
FIG. 4 is a schematic communication diagram of transmitting second system information according to an embodiment of the present invention.

FIG. 4 is a schematic communication diagram of transmitting second system information according to an embodiment of the present invention.

A terminal initiates an RRC connection setup process to a base station according to first system information. Herein, that the terminal initiates the RRC connection setup process by means of random access is used as an example for description. It should be noted that a part 405 and a part 407 in FIG. 4 are optional parts, and one of the parts may be selected and performed.

In a part 401, a terminal sends a random access preamble to a base station.

In a part 402, the base station sends a random access response message to the terminal.

In a part 403, the terminal sends an RRC connection request message to the base station. Optionally, the terminal requests, in the RRC connection request message, the base station to send second system information to a beam in which the terminal is located.

In a part 404, the base station sends an RRC connection setup message to the terminal.

In a part 405, the base station sends the second system information on the beam in which the terminal is located. A specific implementation process of sending the second system information by the base station is similar to a process of sending the first system information by the base station on the beam in which the terminal is located. Reference may be made to the detailed descriptions in the part 304, and details are not described herein again.

In a part 406, the terminal sends an RRC connection setup complete message to the base station. Optionally, the terminal requests, in the RRC connection setup complete message, the base station to send the second system information on the beam in which the terminal is located.

In the part 407, the base station sends the second system information on the beam in which the terminal is located. The part 407 is similar to the part 405. Reference may be made to the detailed descriptions in the part 405, and details are not described herein again.

It should be noted that the base station may send, according to a request of the terminal that is in the RRC connection request or the RRC connection setup complete message, the second system information on the beam in which the terminal is located, or may directly send the second system information on the beam in which the terminal is located. That is, regardless of being requested by the terminal or not, the base station sends the second system information on the beam in which the terminal is located.

In an example, the base station does not perform steps in the part 405 and the part 407, but the base station sends the second system information to the terminal by using dedicated RRC signaling. For example, the base station adds RRC signaling including the second system information to the RRC connection setup message, or the base station sends the RRC signaling including the second system information to the terminal after receiving the RRC connection setup complete message sent by the terminal.

In an example, if the second system information changes, because the base station knows a beam in which a terminal in an RRC connected mode is located, the base station may send changed second system information only to a beam of the terminal that is in the RRC connected mode, thereby reducing overheads.

Figure 5:
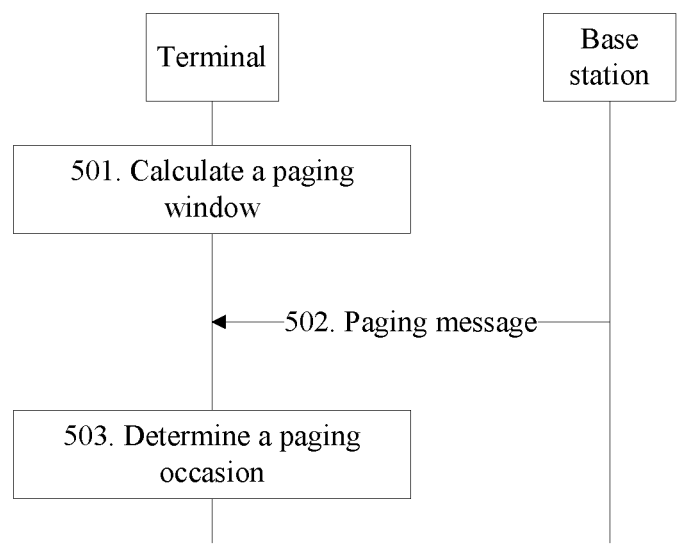
FIG. 5 is a schematic communication diagram of a paging method according to an embodiment of the present invention.

When the first system information includes paging channel configuration information, the terminal may further calculate a paging window according to the paging channel configuration information, and receive, in the paging window, a paging message sent by the base station. Further, the terminal may determine a paging occasion after receiving the paging message. FIG. 5 is a schematic flowchart of a paging method according to an embodiment of the present invention.

In a part 501, a terminal calculates a paging window according to paging channel configuration information. In an example, the terminal calculates the paging window by determining a start subframe and a time length of the paging window. For example, the terminal calculates, according to the paging channel configuration information, a paging frame and a paging subframe to which a predicted paging occasion (PO) belongs, uses the paging subframe as a start subframe of the paging window for monitoring a paging message, and uses a total time length, as a time length of the paging window, that is obtained by multiplying a quantity of beams of a cell by a switching time of the beams.

It should be noted that, if the first system information does not change, after receiving the first system information, the terminal needs to calculate the paging window only once according to the paging channel configuration information included in the first system information. If the terminal has calculated the paging window, the part 501 may not be performed, and a part 502 may be performed directly.

In the part 502, the terminal receives a paging message in the paging window.

In a part 503, the terminal uses a subframe to which the paging message belongs as an actual paging occasion. In an example, the terminal calculates, according to a beam identifier of a beam in which the terminal is located, the subframe to which the paging message belongs, and uses the subframe as the actual paging occasion. After determining the actual paging occasion, the terminal needs to monitor and receive the paging message only in the subframe to which the actual paging occasion belongs. Therefore, a time of monitoring the paging message by the terminal can be reduced, so as to reduce power consumption of the terminal.

It should be noted that, if the first system information does not change, the terminal needs to determine the actual paging occasion only once. If the terminal has determined the actual paging occasion, the terminal may not perform the foregoing step of determining the actual paging occasion and the step before determining the actual paging occasion, and may directly receive the paging message at the determined actual paging occasion.

In this embodiment of the present invention, only the part 501 and the part 502 may be performed, or the parts 501 to 503 may be performed.

Figure 6:
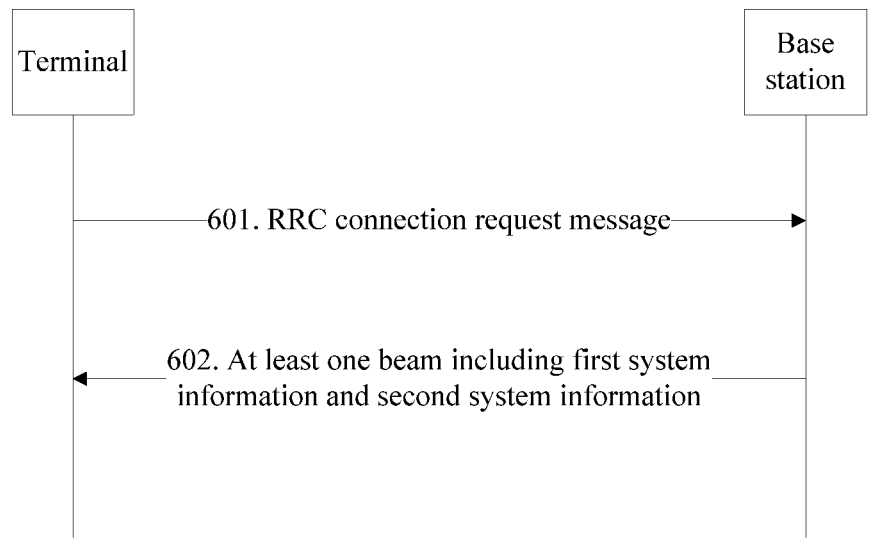
FIG. 6 is another schematic communication diagram of transmitting system information according to an embodiment of the present invention.

In another method for transmitting system information provided in an embodiment of the present invention, a terminal sends an uplink signal, where the uplink signal is used to trigger a base station to send first system information and second system information; after receiving the uplink signal sent by the terminal, the base station sends the first system information and the second system information on a beam in which the terminal is located; and correspondingly, the terminal receives the first system information and the second system information sent by the base station on the beam in which the terminal is located. In this embodiment, for content that is the same as or similar to that in the foregoing embodiments, reference may be made to the detailed descriptions in the foregoing embodiments, and details are not described herein again. As shown in FIG. 6, the following provides descriptions by using an example in which an uplink signal is an RRC connection setup request.

In a part 601, a terminal sends an RRC connection setup request. In an example, an RRC connection setup request message includes request information for requesting a base station to send first system information and second system information. In another example, an RRC connection setup request message is used to trigger a base station to send first system information and second system information.

In a part 602, after receiving the RRC connection setup request sent by the terminal, the base station sends first system information and second system information on a beam in which the terminal is located. In an example, the base station sends the first system information and the second system information according to the request of the terminal. In another example, after receiving the RRC connection setup request message, the base station instantly sends the first system information and the second system information on the beam in which the terminal is located. Correspondingly, the terminal receives the first system information and the second system information sent by the base station. In this way, the terminal may rapidly establish a communication service in a cell after receiving the first system information and the second system information.

The foregoing mainly describes the solutions provided in the embodiments of the present invention from a perspective of interaction between network elements. It can be understood that, to implement the foregoing functions, the network elements, such as the terminal and the base station, include corresponding hardware structures and/or software modules for performing the functions. A person skilled in the art should be easily aware that, in the present invention, units and algorithm steps in examples described with reference to the embodiments disclosed in this specification may be implemented by hardware or a combination of hardware and computer software. Whether a function is performed by hardware or by computer software driving hardware depends on particular applications and design constraint conditions of the technical solutions. A person skilled in the art may use different methods to implement the described functions for each particular application, but it should not be considered that the implementation goes beyond the scope of the present invention.

Figure 7:
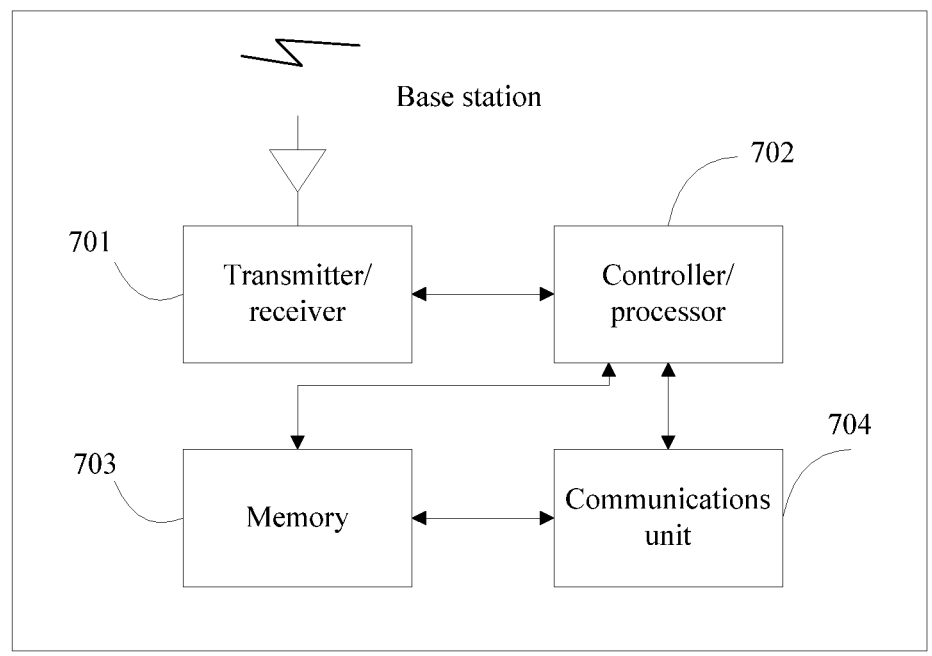
FIG. 7 is a schematic structural diagram of a base station according to an embodiment of the present invention.

FIG. 7 is a possible schematic structural diagram of the base station included in the foregoing embodiments.

The base station includes a transmitter/receiver 701, and may further include a controller/processor 702, a memory 703, and a communications unit 704. The transmitter/receiver 701 is configured to support information transmission and reception between the base station and the terminal in the foregoing embodiments and support radio communication between the terminal and another terminal. The controller/processor 702 performs various functions for communicating with the terminal. In uplink, an uplink signal coming from the terminal is received by an antenna, demodulated by the receiver 701, and further processed by the controller/processor 702 to restore service data and signaling information that are sent by the terminal. In downlink, service data and a signaling message are processed by the controller/processor 702, and modulated by the transmitter 701 to generate a downlink signal, and the downlink signal is transmitted to the terminal by the antenna. The controller/processor 702 further performs the processing procedures related to the base station in FIG. 2 to FIG. 6 and/or other procedures applied to the technologies described in this application. The memory 703 is configured to store program code and data of the base station. The communications unit 704 is configured to support communication between the base station and another network entity.

It can be understood that FIG. 7 shows only a simplified design of the base station. In actual application, the base station may include any quantity of transmitters, receivers, processors, controllers, memories, communications units, and the like. All base stations that can implement the present invention fall within the protection scope of the present invention.

Figure 8:
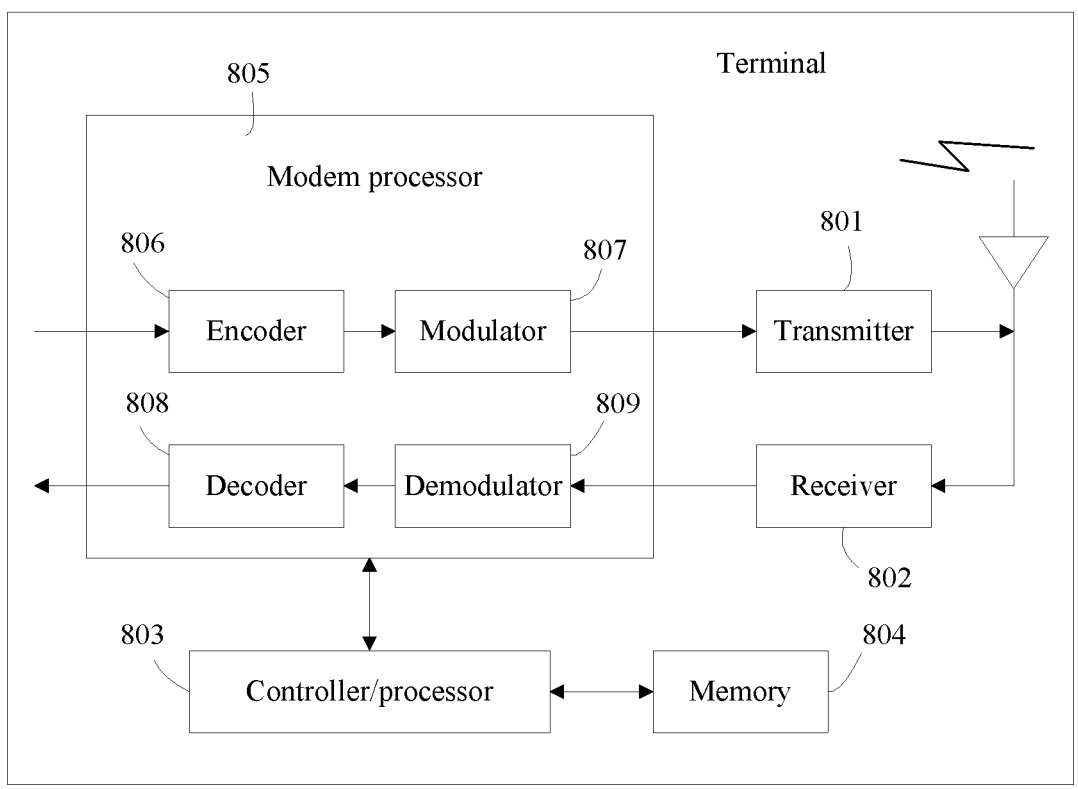
FIG. 8 is a schematic structural diagram of a terminal according to an embodiment of the present invention.

FIG. 8 is a simplified schematic diagram of a possible design structure of the terminal included in the foregoing embodiments. The terminal includes a transmitter 801 and a receiver 802, and may further include a controller/processor 803, a memory 804, and a modem processor 805.

The transmitter 801 adjusts (for example, digital-analog converts, filters, amplifies, and up-converts) an output sample and generates an uplink signal. The uplink signal is transmitted by an antenna to the base station in the foregoing embodiments. In downlink, the antenna receives a downlink signal transmitted by the base station in the foregoing embodiments. The receiver 802 adjusts (for example, filters, amplifies, down-converts, and digitalizes) a signal received from the antenna and provides an input sample. In the modem processor 805, an encoder 806 receives service data and a signaling message that are to be sent in uplink, and processes (for example, formats, encodes, and interleaves) the service data and the signaling message. A modulator 807 further processes encoded service data and an encoded signaling message (for example, performs symbol mapping and modulation) and provides an output sample. A demodulator 809 processes (for example, demodulates) the input sample and provides symbol estimation. A decoder 808 processes (for example, de-interleaves and decodes) the symbol estimation and provides decoded data and a decoded signaling message that are sent to the terminal. The encoder 806, the modulator 807, the demodulator 809, and the decoder 808 may be implemented by the combined modem processor 805. These units perform processing according to a radio access technology (for example, an access technology used by an LTE system or another evolved system) used by a radio access network.

The controller/processor 803 controls and manages an action of the terminal and is configured to perform processing implemented by the terminal in the foregoing embodiments. For example, the controller/processor 803 is configured to control the terminal to predetermine, according to a downlink DRS, that a cell is suitable for camping and/or control other procedures of the technologies described in the present invention. For example, the controller/processor 803 is configured to support the terminal in executing the process 302 in FIG. 3*a*, and the processes 501 and 503 in FIG. 5. The memory 804 is configured to store program code and data of the terminal.

The controller/processor configured to perform functions of the base station and the terminal in the present invention may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in the present invention. Alternatively, the processor may be a combination implementing a computing function, for example, a combination including one or more microprocessors, or a combination of the DSP and a microprocessor.

Steps of the method or algorithm described with reference to the content disclosed in the present invention may be implemented by hardware, or may be implemented by a processor executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium in any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a terminal. Certainly, the processor and the storage medium may exist in the terminal as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

Further embodiments of the present invention are provided in the following. It should be noted that the numbering used in the following section does not necessarily need to comply with the numbering used in the previous sections.

Embodiment 1. A method for sending system information. The method includes receiving, by a base station, an uplink signal sent by a terminal. The uplink signal is used to trigger the base station to send first system information. The first system information is used by the terminal to camp on a cell. The method includes sending, by the base station, the first system information on a beam in which the terminal is located.

Embodiment 2. The method according to embodiment 1, wherein before the receiving, by a base station, an uplink signal sent by a terminal, the method further comprises: sending, by the base station in the cell, a downlink signal by using at least one beam, wherein the downlink signal comprises a downlink discovery reference signal (DRS), and the downlink DRS is used by the terminal to discover the cell.

Embodiment 3. The method according to embodiment 2, wherein the receiving, by a base station, an uplink signal sent by a terminal comprises: receiving, by the base station, the uplink signal sent by the terminal according to preset configuration information of the uplink signal.

Embodiment 4. The method according to embodiment 2, wherein the downlink signal further comprises configuration information of the uplink signal, and the receiving, by a base station, an uplink signal sent by the terminal comprises: receiving, by the base station, the uplink signal sent by the terminal according to the configuration information of the uplink signal, wherein the configuration information of the uplink signal is sent by the base station.

Embodiment 5. The method according to any one of embodiments 1 to 4, wherein after the sending, by the base station, the first system information on a beam in which the terminal is located, the method further comprises: sending, by the base station in a radio resource control (RRC) connection setup process or after an RRC connection setup process initiated by the terminal according to the first system information, second system information on the beam in which the terminal is located, wherein the second system information is used by the terminal to perform communication in the cell.

Embodiment 6. The method according to embodiment 5, wherein the sending, by the base station in an RRC connection setup process or after an RRC connection setup process initiated by the terminal according to the first system information, second system information on the beam in which the terminal is located comprises one of the following cases: the base station sends the second system information after sending an RRC connection setup message; the base station sends the second system information after receiving an RRC connection setup complete message sent by the terminal.

Embodiment 7. The method according to any one of embodiments 1 to 4, wherein the first system information comprises at least one of broadcast channel configuration information, operator information, and tracking area information.

Embodiment 8. The method according to embodiment 7, wherein the first system information further comprises paging channel configuration information, wherein the paging channel configuration information is used by the terminal to calculate a paging window.

Embodiment 9. A method for receiving system information, comprising: sending, by a terminal, an uplink signal, wherein the uplink signal is used to trigger a base station to send first system information, and the first system information is used by the terminal to camp on a cell; and receiving, by the terminal, the first system information sent by the base station on a beam in which the terminal is located.

Embodiment 10. The method according to embodiment 9, wherein before the sending, by a terminal, an uplink signal, the method further comprises: receiving, by the terminal, a downlink signal sent by the base station in the cell by using at least one beam, wherein the downlink signal comprises a downlink discovery reference signal (DRS), and the downlink DRS is used by the terminal to discover the cell.

Embodiment 11. The method according to embodiment 10, wherein before the sending, by a terminal, an uplink signal, the method further comprises: predetermining, by the terminal according to the downlink DRS, that the cell is suitable for camping.

Embodiment 12. The method according to embodiment 11, wherein the sending, by a terminal, an uplink signal comprises: sending, by the terminal, the uplink signal to the base station according to preset configuration information of the uplink signal.

Embodiment 13. The method according to embodiment 11, wherein the downlink signal further comprises configuration information of the uplink signal, and the sending, by a terminal, an uplink signal comprises: sending, by the terminal, the uplink signal to the base station according to the configuration information of the uplink signal, wherein the configuration information of the uplink signal is sent by the base station.

Embodiment 14. The method according to any one of embodiments 9 to 13, wherein after the receiving, by the terminal, the first system information sent by the base station on a beam in which the terminal is located, the method further comprises: initiating, by the terminal, a radio resource control (RRC) connection setup process to the base station according to the first system information; and receiving, by the terminal in the RRC connection setup process or after the RRC connection setup process, second system information sent by the base station on the beam in which the terminal is located, wherein the second system information is used by the terminal to perform communication in the cell.

Embodiment 15. The method according to embodiment 14, wherein the receiving, by the terminal in the RRC connection setup process or after the RRC connection setup process, second system information sent by the base station on the beam in which the terminal is located comprises one of the following cases: the terminal receives the second system information that is sent by the base station after the base station sends an RRC connection setup message; the terminal receives the second system information that is sent by the base station after the base station receives an RRC connection setup complete message sent by the terminal.

Embodiment 16. The method according to any one of embodiments 9 to 13, wherein the first system information comprises at least one of broadcast channel configuration information, operator information, and tracking area information.

Embodiment 17. The method according to embodiment 16, wherein the first system information further comprises paging channel configuration information, wherein the paging channel configuration information is used by the terminal to calculate a paging window, and after the receiving, by the terminal, the first system information sent by the base station on a beam in which the terminal is located, the method further comprises: calculating, by the terminal, the paging window according to the paging channel configuration information.

Embodiment 18. A base station, comprising: a receiver, configured to receive an uplink signal sent by a terminal. The uplink signal is used to trigger the base station to send first system information, and the first system information is used by the terminal to camp on a cell. The base station further comprises a transmitter, configured to send the first system information on a beam in which the terminal is located.

Embodiment 19. The base station according to embodiment 18, wherein the transmitter is further configured to: before the receiver receives the uplink signal sent by the terminal, send, in the cell, a downlink signal by using at least one beam, wherein the downlink signal comprises a downlink discovery reference signal (DRS), and the downlink DRS is used by the terminal to discover the cell.

Embodiment 20. The base station according to embodiment 19, wherein the receiver is specifically configured to receive the uplink signal that is sent by the terminal according to preset configuration information of the uplink signal.

Embodiment 21. The base station according to embodiment 19, wherein the downlink signal further comprises configuration information of the uplink signal, and the receiver is specifically configured to receive the uplink signal sent by the terminal according to the configuration information of the uplink signal, wherein the configuration information of the uplink signal is sent by the transmitter.

Embodiment 22. The base station according to any one of embodiments 18 to 21, wherein the transmitter is further configured to: after sending the first system information on the beam in which the terminal is located, send, in a radio resource control (RRC) connection setup process or after an RRC connection setup process initiated by the terminal according to the first system information, second system information on the beam in which the terminal is located, wherein the second system information is used by the terminal to perform communication in the cell.

Embodiment 23. The base station according to embodiment 22, wherein that the transmitter sends, in an RRC connection setup process or after an RRC connection setup process initiated by the terminal according to the first system information, second system information on the beam in which the terminal is located comprises one of the following cases: the transmitter sends the second system information after sending an RRC connection setup message; the transmitter sends the second system information after the receiver receives an RRC connection setup complete message sent by the terminal.

Embodiment 24. The base station according to any one of embodiments 18 to 21, wherein the first system information comprises at least one of broadcast channel configuration information, operator information, and tracking area information.

Embodiment 25. The base station according to embodiment 24, wherein the first system information further comprises paging channel configuration information, wherein the paging channel configuration information is used by the terminal to calculate a paging window.

Embodiment 26. A terminal, comprising: a transmitter, configured to send an uplink signal. The uplink signal is used to trigger a base station to send first system information, and the first system information is used by the terminal to camp on a cell. The terminal further comprises a receiver, configured to receive the first system information sent by the base station on a beam in which the terminal is located.

Embodiment 27. The terminal according to embodiment 26, wherein the receiver is further configured to: before the transmitter sends the uplink signal, receive a downlink signal sent by the base station in the cell by using at least one beam, wherein the downlink signal comprises a downlink discovery reference signal (DRS), and the downlink DRS is used by the terminal to discover the cell.

Embodiment 28. The terminal according to embodiment 27, wherein the terminal further comprises: at least one processor, configured to predetermine, according to the downlink DRS, that the cell is suitable for camping.

Embodiment 29. The terminal according to embodiment 28, wherein the transmitter is specifically configured to send the uplink signal to the base station according to preset configuration information of the uplink signal.

Embodiment 30. The terminal according to embodiment 28, wherein the downlink signal further comprises configuration information of the uplink signal, and the transmitter is specifically configured to send the uplink signal to the base station according to the configuration information of the uplink signal, wherein the configuration information of the uplink signal is sent by the base station.

Embodiment 31. The terminal according to any one of embodiments 28 to 30, wherein the at least one processor is further configured to: after the receiver receives the first system information sent by the base station on the beam in which the terminal is located, initiate a radio resource control (RRC) connection setup process to the base station according to the first system information; and the receiver is further configured to receive, in the RRC connection setup process or after the RRC connection setup process, second system information sent by the base station on the beam in which the terminal is located, wherein the second system information is used by the terminal to perform communication in the cell.

Embodiment 32. The terminal according to embodiment 31, wherein that the receiver receives, in the RRC connection setup process or after the RRC connection setup process, second system information sent by the base station on the beam in which the terminal is located comprises one of the following cases: the receiver receives the second system information that is sent by the base station after the base station sends an RRC connection setup message; the receiver receives the second system information that is sent by the base station after the base station receives an RRC connection setup complete message sent by the terminal.

Embodiment 33. The terminal according to any one of embodiments 28 to 30, wherein the first system information comprises at least one of broadcast channel configuration information, operator information, and tracking area information.

Embodiment 34. The terminal according to embodiment 33, wherein the first system information further comprises paging channel configuration information, wherein the paging channel configuration information is used by the terminal to calculate a paging window, and the at least one processor is further configured to calculate the paging window according to the paging channel configuration information.

Embodiment 35. A method for receiving system information. The method comprises sending, by a terminal, a radio resource control (RRC) connection request message to a base station. The RRC connection request message is used to request the base station to send second system information on a beam in which the terminal is located, and the second system information is used by the terminal to perform communication in a cell. The method further comprises receiving, by the terminal, the second system information from the base station.

Embodiment 36. The method according to embodiment 35, wherein the second system information comprises at least one of the following information: cell reselection configuration information, primary notification information of an earthquake and tsunami warning system (ETWS), secondary notification of an ETWS, notification information of a commercial mobile alert system (CMAS), and a multimedia broadcast multicast system (MBMS) information; wherein the cell reselection configuration information comprises at least one of the following information: a reselection threshold, a cell reselection priority, intra-frequency cell reselection configuration information, and inter-frequency cell reselection configuration information.

Embodiment 37. The method according to embodiment 35 or 36, wherein the receiving, by the terminal, the second system information from the base station comprises: receiving, by the terminal, dedicated RRC signaling from the base station, wherein the dedicated RRC signaling comprises the second system information.

Embodiment 38. The method according to any one of embodiments 35-37, before the receiving, by the terminal, the second system information from the base station, the method further comprises: receiving, by the terminal, an RRC connection setup message from the base station; sending, by the terminal, an RRC connection setup complete message to the base station.

Embodiment 39. The method according to any one of embodiments 35-38, before the sending, by a terminal, a radio resource control (RRC) connection request message to a base station, the method further comprises: sending, by the terminal, a random access preamble to the base station; receiving, by the terminal, a random access response message from the base station.

Embodiment 40. A method for sending system information, comprising: receiving, by a base station, a radio resource control (RRC) connection request message from a terminal, wherein the RRC connection request message is used to request the base station to send second system information on a beam in which the terminal is located, and the second system information is used by the terminal to perform communication in a cell; sending, by the base station, the second system information on the beam in which the terminal is located.

Embodiment 41. The method according to embodiment 40, wherein the second system information comprises at least one of the following information: cell reselection configuration information, primary notification information of an earthquake and tsunami warning system (ETWS), secondary notification information of an ETWS, notification information of a commercial mobile alert system (CMAS), and a multimedia broadcast multicast system (MBMS) information; wherein the cell reselection configuration information comprises at least one of the following information: a reselection threshold, a cell reselection priority, intra-frequency cell reselection configuration information, and inter-frequency cell reselection configuration information.

Embodiment 42. The method according to embodiment 40 or 41, wherein the sending, by the base station, the second system information on the beam in which the terminal is located comprises: sending, by the base station, dedicated RRC signaling to the terminal, wherein the dedicated RRC signaling comprises the second system information.

Embodiment 43. The method according to any one of embodiments 40-42, before the sending, by the base station, the second system information on the beam in which the terminal is located, the method further comprises: sending, by the base station, an RRC connection setup message to the terminal; receiving, by the base station, an RRC connection setup complete message from the terminal.

Embodiment 44. The method according to any one of embodiments 40-43, before the receiving, by a base station, a radio resource control (RRC) connection request message from a terminal, the method further comprises: receiving, by the base station, a random access preamble from the terminal; sending, by the base station, a random access response message to the terminal.

Embodiment 45. An apparatus for receiving system information, comprising: a transmitter, configured to send a radio resource control (RRC) connection request message to a base station. The RRC connection request message is used to request the base station to send second system information on a beam in which the apparatus is located, and the second system information is used by the apparatus to perform communication in a cell. The apparatus further comprises a receiver, configured to receive the second system information from the base station.

Embodiment 46. The apparatus according to embodiment 45, wherein the second system information comprises at least one of the following information: cell reselection configuration information, primary notification information of an earthquake and tsunami warning system (ETWS), secondary notification information of an ETWS, notification information of a commercial mobile alert system (CMAS), and a multimedia broadcast multicast system (MBMS) information; wherein the cell reselection configuration information comprises at least one of the following information: a reselection threshold, a cell reselection priority, intra-frequency cell reselection configuration information, and inter-frequency cell reselection configuration information.

Embodiment 47. The apparatus according to embodiment 45 or 46, wherein the receiver is specifically configured to receive dedicated RRC signaling from the base station, wherein the dedicated RRC signaling comprises the second system information.

Embodiment 48. The apparatus according to any one of embodiments 45-47, the receiver is further configured to: before the receive receives the second system information from the base station, receive an RRC connection setup message from the base station; and the transmitter is further configured to send an RRC connection setup complete message to the base station.

Embodiment 49. The apparatus according to any one of embodiments 45-48, the transmitter is further configured to: before the transmitter sends the radio resource control (RRC) connection request message to a base station, send a random access preamble to the base station; and the receiver is further configured to receive a random access response message from the base station.

Embodiment 50. The apparatus according to any one of embodiments 45-49, wherein the apparatus is a terminal.

Embodiment 51. An apparatus for sending system information, comprising: a receiver, configured to receive a radio resource control (RRC) connection request message from a terminal, wherein the RRC connection request message is used to request the apparatus to send second system information on a beam in which the terminal is located, and the second system information is used by the terminal to perform communication in a cell; a transmitter, configured to send the second system information on the beam in which the terminal is located.

Embodiment 52. The apparatus according to embodiment 51, wherein the second system information comprises at least one of the following information: cell reselection configuration information, primary notification information of an earthquake and tsunami warning system (ETWS), secondary notification information of an ETWS, notification information of a commercial mobile alert system (CMAS), and a multimedia broadcast multicast system (MBMS) information; wherein the cell reselection configuration information comprises at least one of the following information: a reselection threshold, a cell reselection priority, intra-frequency cell reselection configuration information, and inter-frequency cell reselection configuration information.

Embodiment 53. The apparatus according to embodiment 51 or 52, wherein the transmitter is specifically configured to send dedicated RRC signaling to the terminal, wherein the dedicated RRC signaling comprises the second system information.

Embodiment 54. The apparatus according to any one of embodiment 51-53, the transmitter is further configured to: before the transmitter sends the second system information on the beam in which the terminal is located, send an RRC connection setup message to the terminal; and the receiver is further configured to receive an RRC connection setup complete message from the terminal.

Embodiment 55. The apparatus according to any one of 51-54, the receiver is further configured to: before the receiver receives the radio resource control (RRC) connection request message from a terminal, receive a random access preamble from the terminal; and the transmitter is further configured to send a random access response message to the terminal.

Embodiment 56. The apparatus according to any one of 51-55, wherein the apparatus is a base station.

Embodiment 57. A communications system, comprising the base station according to any one of embodiments 18 to 21 and the terminal according to any one of embodiments 26 to 30; or comprising the apparatus according to any one of embodiments 45-50 and the apparatus according to any one of embodiment 51-56.

Embodiment 58. A method for sending system information, comprising: receiving, by a base station, an uplink signal from a terminal, wherein the uplink signal is used to trigger the base station to send first system information, and the first system information comprises cell reselection configuration information, wherein the cell reselection configuration information comprises at least one of the following information: a reselection threshold, a cell reselection priority, intra-frequency cell reselection configuration information, and inter-frequency cell reselection configuration information; sending, by the base station, the first system information on a beam in which the terminal is located.

Embodiment 59. The method according to embodiment 58, wherein the uplink signal is a random access preamble, an uplink discovery reference signal (DRS), a sounding reference signal (SRS), or a preset signal that is specially used to trigger the base station to send the first system information.

What is claimed is:

1. A method, comprising:
 receiving, by a terminal, configuration information for a random access preamble;
 sending, by the terminal, according to the configuration information, the random access preamble to a base station, wherein the random access preamble triggers the base station to send first system information comprising cell reselection configuration information, wherein the cell reselection configuration information comprises:
 a reselection threshold;
 a cell reselection priority;
 intra-frequency cell reselection configuration information; or
 inter- frequency cell reselection configuration information; and
 receiving, by the terminal, the first system information from the base station.

2. The method according to claim 1, further comprising:
 receiving, by the terminal, a downlink signal; and
 obtaining, by the terminal according to the downlink signal, information about a beam.

3. The method according to claim 2, wherein receiving, by the terminal, the first system information from the base station comprises:
 receiving, by the terminal, the first system information from the base station on the beam.

4. The method according to claim 2, wherein the downlink signal comprises a synchronization signal or a reference signal.

5. An apparatus, comprising:
 a receiver configured to receive configuration information for a random access preamble;
 a transmitter configured to send the random access preamble according to the configuration information to a base station, wherein the random access preamble triggers the base station to send first system information comprising cell reselection configuration information, and wherein the cell reselection configuration information comprises:
 a reselection threshold;
 a cell reselection priority;
 intra-frequency cell reselection configuration information; or
 inter-frequency cell reselection configuration information; and
 wherein the receiver is further configured to receive the first system information from the base station.

6. The apparatus according to claim 5, wherein the receiver is further configured to receive a downlink signal and wherein information about a beam is obtained according to the downlink signal.

7. The apparatus according to claim 6, wherein the receiver being configured to receive the first system information from the base station comprises the receiver being configured to receive the first system information from the base station on the beam.

8. The apparatus according to claim 6, wherein the downlink signal comprises a synchronization signal or a reference signal.

9. An apparatus, comprising:
 a transmitter configured to send configuration information for a random access preamble, wherein the configuration information configures the random access preamble;
 a receiver configured to receive the random access preamble from a terminal, wherein the random access preamble triggers the apparatus to send first system information comprising cell reselection configuration information, wherein the cell reselection configuration information comprises:
 a reselection threshold;
 a cell reselection priority;
 intra-frequency cell reselection configuration information; or
 inter-frequency cell reselection configuration information; and
 the transmitter is further configured to send the first system information to the terminal.

10. The apparatus according to claim 9, wherein the transmitter is further configured to transmit a downlink signal, wherein the downlink signal indicates information about a beam.

11. The apparatus according to claim 10, wherein the transmitter configured to send the first system information to the terminal comprises:
the transmitter is configured to send the first system information on the beam to the terminal.

12. The apparatus according to claim 10, wherein the downlink signal comprises a synchronization signal or a reference signal.

13. A non-transitory computer readable medium, wherein the non-transitory computer readable medium stores instructions that are executable by a computer, and the instructions comprise instructions for:
receiving configuration information for a random access preamble;
sending the random access preamble, according to the configuration information, to a base station, wherein the random access preamble triggers the base station to send first system information comprising cell reselection configuration information, wherein the cell reselection configuration information comprises:
a reselection threshold;
a cell reselection priority;
intra-frequency cell reselection configuration information; or
inter- frequency cell reselection configuration information; and
receiving the first system information from the base station.

14. The non-transitory computer readable medium according to claim 13, wherein the instructions further comprise instructions for:
receiving a downlink signal; and
obtaining information about a beam according to the downlink signal.

15. The non-transitory computer readable medium according to claim 14, wherein the instructions further comprise instructions for:
receiving the first system information from the base station on the beam.

16. The non-transitory computer readable medium according to claim 14, wherein the downlink signal comprises a synchronization signal or a reference signal.

* * * * *